March 1, 1932.  A. F. SPITZGLASS  1,847,105
ELECTRICAL PRODUCT REGISTERING APPARATUS
Filed June 11, 1926
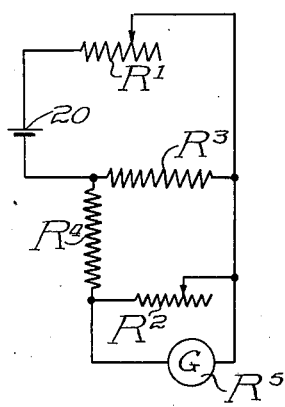
Fig. 2.
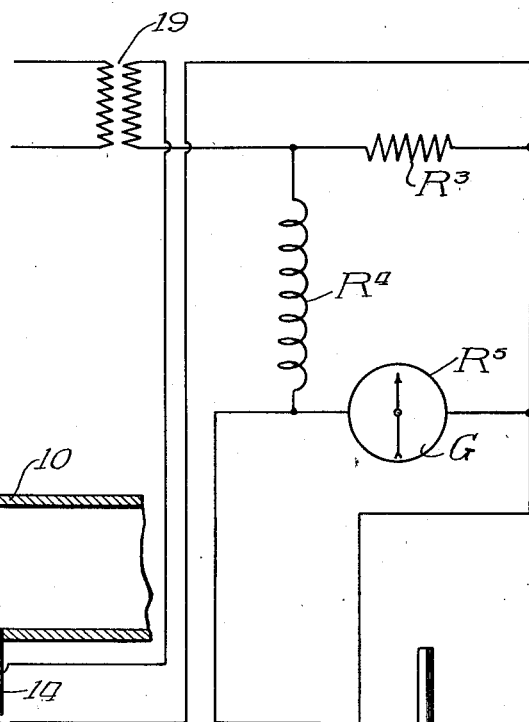
Fig. 1.
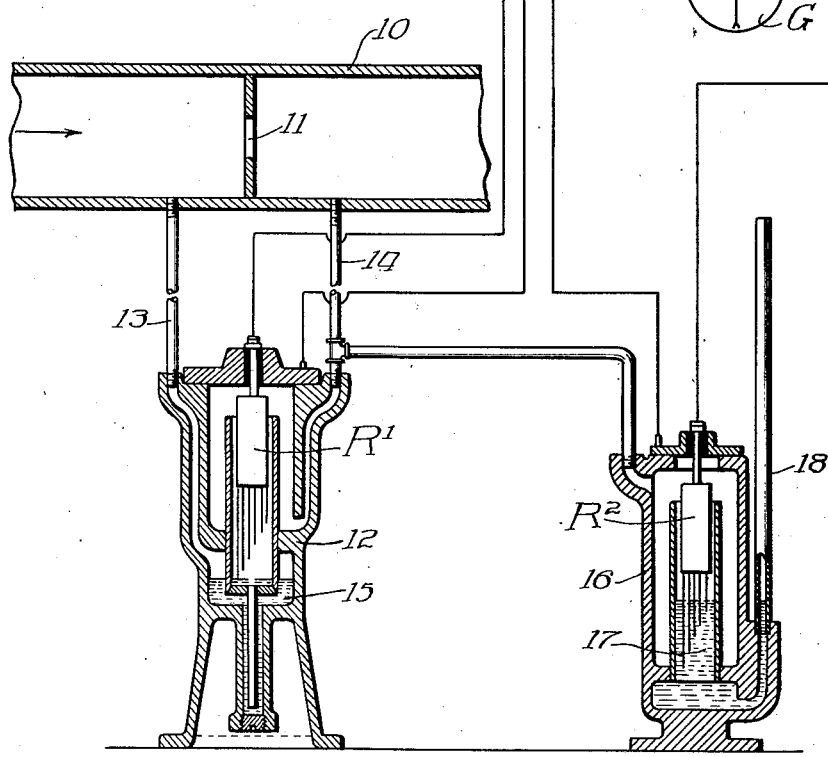
Inventor.
Albert F. Spitzglass
By Nissen & Crane
Attys.

Patented Mar. 1, 1932

1,847,105

UNITED STATES PATENT OFFICE

ALBERT F. SPITZGLASS, OF CHICAGO, ILLINOIS, ASSIGNOR TO REPUBLIC FLOW METERS COMPANY, OF CHICAGO, ILLINOIS, A CORPORATION OF ILLINOIS

ELECTRICAL PRODUCT REGISTERING APPARATUS

Application filed June 11, 1926. Serial No. 115,246.

This invention relates to apparatus for indicating by means of an electrical instrument the product of a plurality of variable quantities.

The invention has for one of its objects the provision of such mechanism which shall be practical to manufacture and install, and accurate within the allowable error in observation and sensitivity of the electrical measuring instrument used.

Another object of the invention is to provide specifically an apparatus for automatically correcting the reading of a flow meter for variation in density of the flowing fluid.

Other objects will appear hereinafter.

The invention is exemplified in the combination and arrangement of parts shown in the accompanying drawings and described in the following specification, and it is more particularly pointed out in the appended claims.

In the drawings—

Fig. 1 is a diagrammatic elevation, with parts in section, showing the application of the invention to measurement of the flow of fluid in a conduit; and Fig. 2 is a wiring diagram showing the electrical circuit of the general form of the invention.

Referring first to Fig. 1, the numeral 10 designates a conduit provided with a restricted orifice 11 for producing differential pressure in the conduit. The flow of fluid in the conduit is in the direction of the arrow. A flow meter 12 is connected by pipes 13 and 14 to the conduit 10 at opposite sides of the orifice 11. The flow meter is provided with a conducting fluid 15 subjected to the differential pressure produced by the flow of fluid in the conduit 10. The differential pressure produces a rise of the conducting fluid so as to short-circuit various portions of an electrical resistance $R_1$ contained in the flow meter in a manner well known in the art. A second pressure-operated rheostat 16 is connected to the pipe 14 so that the conducting fluid 17 therein is subjected to the static pressure in the conduit 10, which pressure is balanced by a column of conducting fluid in the pipe 18, the upper end of which is open to atmosphere. Increase in the static pressure in the conduit depresses the liquid 17 so as to introduce more of the resistance $R_2$ in the electrical circuit. The instrument 12 differs from the instrument 16 in that increase in the differential pressure decreases the resistance $R_1$ in the instrument 12, while increase in the static pressure increases the resistance $R_2$ in the instrument 16. Current may be supplied to the electrical circuit from a transformer 19 which will provide a substantially constant electromotive force.

In the diagram shown in Fig. 2, the resistances $R_1$, $R_2$, $R_3$ and $R_4$ have a corresponding relation to the circuit as the same resistances in Fig. 1. The resistance of the galvanometer G is indicated by the letter $R_5$. The circuit is the same in both figures, except that a battery 20 is shown as the source of electromotive force in Fig. 2 instead of the transformer 19, and the resistance $R_4$ is shown as an inductive resistance in Fig. 1 and as a non-inductive resistance in Fig. 2.

Referring to Fig. 2, if $I_1$ is the current passing through resistance $R_1$ and $E_1$ the total E. M. F. then $$I_1 = \frac{E_1}{R_1 + \cfrac{1}{\cfrac{1}{R_3} + \cfrac{1}{R_4 + \cfrac{1}{\cfrac{1}{R_2} + \cfrac{1}{R_5}}}}} \quad (1)$$

If $R_4$ is made so large that $$\frac{1}{R_4}$$

is small enough to become a negligible factor in the calculations, i. e., if any variations in the resistances $R_2$ and $R_5$ will produce a change in the term $$\frac{1}{R_4 + \cfrac{1}{\cfrac{1}{R_2} + \cfrac{1}{R_5}}} \quad (2)$$

that is smaller than the allowable error in observation or sensitivity in measuring $I_1$ then, neglecting this term:

$$I_1 = \frac{E_1}{R_1 + R_3}$$

But $E_1$ and $R_3$ are constant $$\therefore I_1 = \frac{K_1}{R_1 + K_2}$$

where $K_1$ and $K_2$ are constants $$\therefore I_1 \propto \frac{1}{R_1} \quad (3)$$

If $I_2$, $I_3$, $I_4$ and $I_5$ represent the current in resistances $R_2$, $R_3$, $R_4$ and $R_5$, respectively, $$I_1 = I_4 + I_3 \quad (4)$$

and $$I_4\left(R_4 + \frac{1}{\frac{1}{R_2} + \frac{1}{R_5}}\right) = I_3 R_3 \quad (5)$$

Since $R_4$ is sufficiently large that variation in $R_2$ will not appreciably affect the term $$R_4 + \frac{1}{\frac{1}{R_2} + \frac{1}{R_5}}$$

from (5) we have $$I_4(R_4 + K_3) = I_3 R_3$$

$$I_3 = \frac{I_4(R_4 + K_3)}{R_3} = I_4 K_4 \quad (6)$$

From (4) and (6)

$$I_1 = I_4 + I_4 K_4 = I_4(1 + K_4) = I_4 K_5 \quad (7)$$

Since by (3), $I_1$ is inversely proportional to $R_1$, $I_4$ is, from (7), also inversely proportional to $R_1$ or $$I_4 \propto \frac{1}{R_1} \quad (8)$$

$$I_4 = I_2 + I_5 \quad (9)$$

also $$I_5 R_5 = I_2 R_2 \quad (10)$$

$$I_2 = \frac{I_5 R_5}{R_2}$$

$$I_4 = \frac{I_5 R_5}{R_2} + I_5 = I_5 \cdot \frac{R_5 + R_2}{R_2} \quad (11)$$

$$I_5 = I_4\left(\frac{R_2}{R_5 + R_2}\right) = I_4 f R_2$$

or $I_5$ is proportional to the product of $I_4$ and some function of $R_2$ or $$I_5 \propto I_4 f R_2$$

$$\therefore I_5 \propto f R_1 f R_2 \quad (12)$$

$I_5$ is the current in the galvanometer circuit, hence the galvanometer reading is a measure of the product of functions of the resistances $R_1$ and $R_2$. It will be seen from the above computation and from inspection of Fig. 2 that $I_5$ is proportional to an inverse function of $R_1$ and a direct function of $R_2$.

This will be apparent from the fact that since the current flowing in the resistance $R_3$ is not materially affected by changes in the resistance $R_2$ because of the high value of the resistance $R_4$ the potential drop over the resistance $R_3$ will therefore be dependent upon the total current flowing, and this will be inversely proportional to the resistance $R_1$. When $R_2$ is constant the galvanometer reading will be proportional to the voltage drop over the resistance $R_3$, hence directly proportional to the current flowing in that resistance and inversely proportional to the resistance $R_1$.

In Fig. 1 the resistance $R_1$ will be decreased when the differential pressure is increased and is preferably made inversely proportional to the square root of the differential pressure and consequently inversely proportional to the rate of flow. Since the current is an inverse function of the resistance and the resistance is an inverse function of the rate of flow, the current will be a direct function of the rate of flow and consequently the galvanometer reading will be directly proportional to the rate of flow where it is not affected by changes in the resistance $R_2$. The resistance $R_2$ is preferably made directly proportional to the square root of the static pressure and since the galvanometer reading is a direct function of the resistance $R_2$, the galvanometer reading will be affected directly as the square root of the static pressure, which is the correction desired. That the galvanometer reading is a direct and not an inverse function of the resistance $R_2$ is apparent from the fact that the galvanometer and resistance $R_2$ are in parallel circuits and any increase in the resistance $R_2$ will deflect a greater portion of the current to the galvanometer, hence an increase in the resistance $R_2$ will increase the galvanometer reading, and vice versa. Since the galvanometer reading is directly proportional to the square root of the rate of flow and also of the square root of the static pressure, the resultant or actual galvanometer reading will be proportional to the product of these two factors, namely, the square root of the rate of flow and the square root of the static pressure, which is the function desired to indicate the quantity of fluid passing through the conduit. It will be apparent that if it is desired to indicate a quotient instead of a product, this may be done by varying the resistance $R_2$ directly as one of the variables constituting the ratio instead of inversely as one of the variables as in the apparatus indicated in Fig. 1.

In Fig. 2 the galvanometer reading will vary directly as the resistance $R_2$ and inversely as the resistance $R_1$ so that the resultant reading will be a function of the quotient of $R_2$ divided by $R_1$.

As indicated by the two figures of the drawings, either direct or alternating current may be used and the resistances may be either inductive or non-inductive. In the appended claims it will be understood that the term "resistance" is used broadly to include both inductive and non-inductive resistance. In actual installations it has been found that the following relative values of the variable resistances involved will give satisfactory operation and the error due to the effect of the variation in the resistance $R_2$ upon the main circuit will not exceed .1%. Where $R_1$ is arranged to vary from 20 to 360 ohms and $R_2$ from 12½ to 21 ohms, $R_3$ equals 20 ohms, $R_4$ 100 ohms and $R_5$ 12 ohms. It is understood that these values are given only by way of example, and that they may be varied within wide limits and yet give satisfactory results.

It should be understood that the term "product" as used in this specification and the following claims includes also a ratio or quotient since a ratio or quotient may, of course, be obtained by using the reciprocal of the divisor as a term of multiplication.

I claim:

1. In an electrical measuring system, a circuit having a variable resistance therein, an instrument connected in series with said circuit to register a function of said resistance, a second variable resistance connected with said circuit in parallel with said instrument to modify the reading of said instrument so that the resultant reading is a product of functions of said resistances and a resistance in series with said second variable resistance of sufficiently high relative value that changes in the value of said second variable resistance do not materially affect the amount of current flowing in said circuit.

2. In an electrical measuring system, a circuit having a variable resistance therein, an instrument connected with said circuit to register a function of the total current flowing in said circuit, a second variable resistance in shunt with said instrument and constituting a multiplier for the readings of said instrument as affected by said first variable resistance and a resistance in series with said instrument and second variable resistance of sufficient value compared with said second variable resistance to render the value of said second variable resistance a negligible part of the total of said two resistances.

3. An electrical measuring system comprising a circuit having a fixed and a variable resistance therein, an electrical instrument in shunt with said fixed resistance, and a second variable resistance in shunt with said instrument and constituting a multiplier for the readings of said instrument as effected by said first variable resistance.

4. An electrical measuring system comprising a main circuit having a fixed and a variable resistance therein, an electrical measuring instrument having a second fixed resistance in series therewith, said instrument and second fixed resistance being arranged in parallel with said first fixed resistance, and a variable resistance in shunt with said instrument and in series with said second fixed resistance.

5. An electrical measuring system comprising a main circuit having a substantially constant source of electromotive force, a variable resistance and a fixed resistance arranged in series in said circuit, an electrical instrument and a second fixed resistance arranged in series, the two being in parallel with said first fixed resistance, a second variable resistance in shunt with said instrument and in series with said second fixed resistance, said second fixed resistance being sufficiently high compared with said second variable resistance that changes in said second variable resistance will not materially affect the total current flowing in the main circuit and means responsive to a function of a quantity being measured for varying the said second variable resistance.

6. An electrical measuring system comprising a main circuit having a variable resistance therein, means for varying said resistance inversely as a factor in a computation to be performed, an electrical measuring instrument connected with said circuit for registering a direct function of the current flowing in said circuit, a second variable resistance connected with said circuit in parallel with said instrument and arranged to vary the readings of said instrument as a direct function of said second variable resistance, means for varying said second resistance directly as a second factor to enter into said computation and a resistance in series with said instrument and second variable resistance having a value at least approximately five times that of the maximum value of said second variable resistance.

7. An electrical measuring system comprising a substantially constant source of electromotive force, a main circuit connected with said source and having a variable and a fixed resistance therein, means for varying said variable resistance inversely as a function of a factor to enter into a computation to be made by said measuring system, an electrical measuring instrument having a second relatively high fixed resistance in series therewith, said instrument and second fixed resistance being in shunt with said first fixed resistance, a second variable resistance in shunt with said instrument and in series with said second fixed resistance, and means for varying said second variable resistance directly as a function of a second factor entering into said computation, said second fixed resistance being of sufficient value to render negligible the effect of variations in said second variable resistance on the amount of current flowing in said main circuit.

8. An electrical measuring system for fluid flowing in a conduit comprising a source of substantially constant electromotive force, a main circuit connected with said source and having a fixed and a variable resistance in series therein, means for producing a differential pressure due to the flow of the fluid to be measured, a flow meter actuated by said differential pressure for varying said variable resistance inversely as a function of said flow, an electrical measuring instrument and a second relatively high fixed resistance in series with each other, the two being in shunt with said first-named fixed resistance, a second variable resistance in shunt with said instrument and in series with said second fixed resistance, and means for varying said second variable resistance directly as a function of a variable characteristic of said fluid, said second fixed resistance being of sufficient value to render negligible the effect of variations in said second variable resistance on the amount of current flowing in said main circuit.

In testimony whereof I have signed my name to this specification on this 7th day of June, A. D. 1926.

ALBERT F. SPITZGLASS.